(No Model.)
G. W. HESS.
AUTOMATIC CUT-OFF FOR OIL TANKS.
No. 578,744. Patented Mar. 16, 1897.
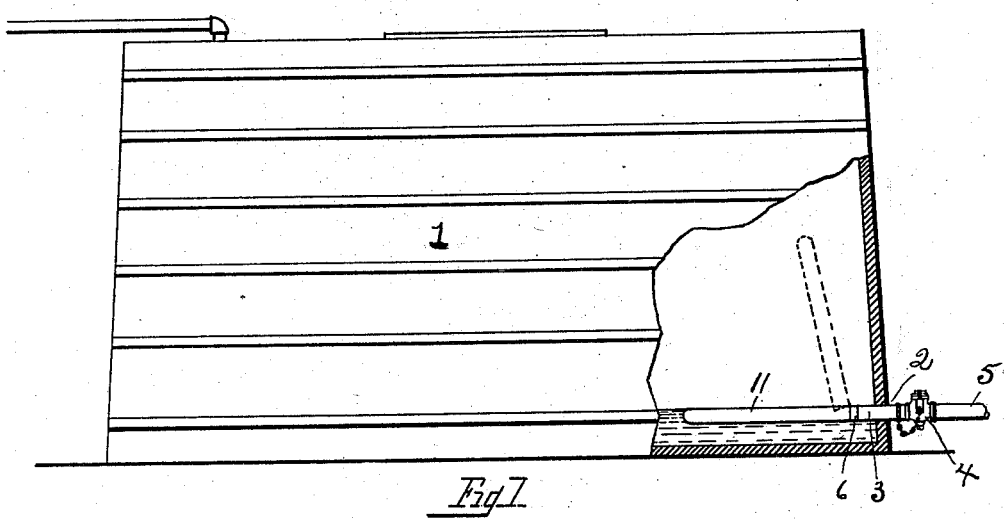
Fig. 1.
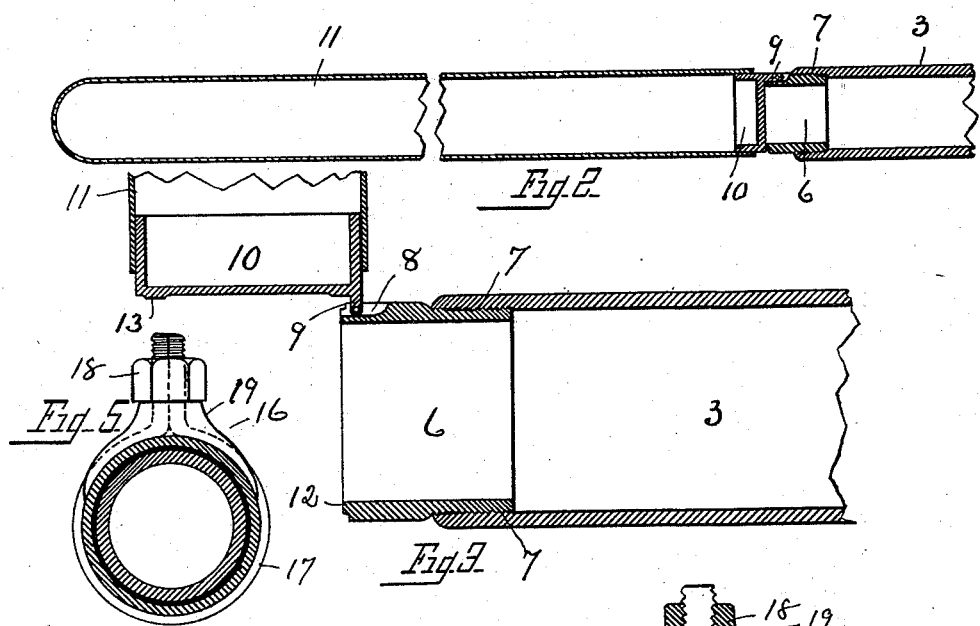
Fig. 2.
Fig. 5.
Fig. 3.
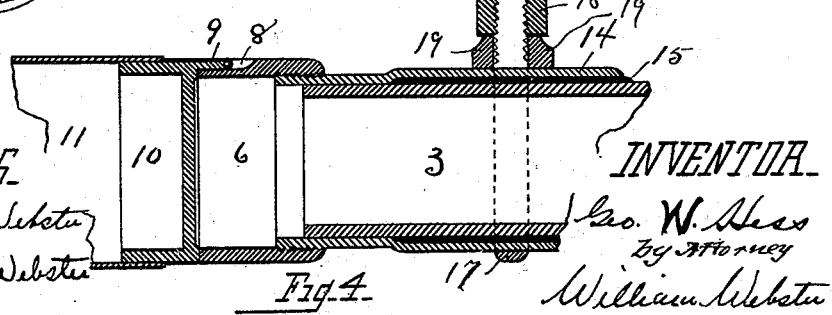
Fig. 4.
WITNESSES
Carroll J. Webster
Frank B. Webster
INVENTOR
Geo. W. Hess
by Attorney
William Webster

UNITED STATES PATENT OFFICE.

GEORGE W. HESS, OF HASKINS, OHIO, ASSIGNOR OF ONE-HALF TO H. J. LEARY, OF TOLEDO, OHIO.

AUTOMATIC CUT-OFF FOR OIL-TANKS.

SPECIFICATION forming part of Letters Patent No. 578,744, dated March 16, 1897.

Application filed July 16, 1894. Serial No. 517,738. (No model.)

*To all whom it may concern:*

Be it known that I, GEORGE W. HESS, of Haskins, county of Wood, and State of Ohio, have invented certain new and useful Improvements in Automatic Cut-Offs for Oil-Tanks; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an automatic cut-off for oil-tanks of that character which shall automatically cut off the flow of oil through the tank when the oil has fallen below the draw-off pipe, by which means a series of tanks may be emptied from one pump without loss of time incident to the passage of air through the pipes, as heretofore.

The invention therefore consists in the parts as hereinafter shown, described, and claimed.

In the drawings, Figure 1 is a sectional elevation of the tank, showing the same empty, the combined float and cut-off being shown raised in dotted lines. Fig. 2 is a sectional detail view of a portion of the nipple and combined float and cut-off, the float being in a lowered position. Fig. 3 is an enlarged detail view of a portion of the same, showing the float and cut-off as raised. Fig. 4 is a detail sectional view of a portion of the nipple and combined float and cut-off, illustrating a modified means for securing the float and cut-off to the nipple, whereby connection may be made inside the tanks. Fig. 5 is a sectional view of the same.

As is well known in drawing off oil from a series of tanks the operation is accomplished by a suction-pump, which is connected with pipes with a series of tanks. The tank nearest the pump receiving the suction will be emptied first, which, as now constructed, will allow air to pass into the pipe when the oil is withdrawn from the pipe below the entrance to the draw-off pipe, thus destroying the suction of the pump, which would cut off the remainder of the tanks upon the line.

This invention has for its object to overcome this difficulty, which is accomplished by automatically cutting off the supply of oil when it has reached a level with the top of the draw-off pipe, by which means, when the tank is empty, the suction is transferred to another tank until all upon the line are empty. To accomplish this result, I have provided a combined float and cut-off, which is secured to the inner end of the nipple, which is of a size to be inserted into the tank from the outside, either when the tank is full or empty.

1 designates the tank, which may be of any of the well-known constructions now in use, which is provided with an opening 2 at a point near the bottom thereof.

3 designates the nipple, which is now passed through the opening 2 and secured in the lock-stop 4, which is a permanent fixture upon the line 5.

Thus far I have described the construction now in use, which in operation would be as follows: When it is desired to empty the tanks, the gager, after measuring the quantity of oil contained in the tanks, opens the lock-stop, allowing the oil to be pumped from the tank, it being understood that the inner end of the nipple 3 is open. When the tank has been emptied to a point below the opening in the nipple, the gager must close the same or the air being drawn into the line will destroy the suction of the pump.

My invention comprises a cut-off for the end of the nipple; and it consists in valve-seat 6, secured to the inner end of the nipple, preferably by being screwed therein, as shown at 7. The upper side of the section 6 is grooved, as shown at 8, in which passes a projection 9 of a cut-off 10, and secured to the cut-off is a float 11.

In order to secure a tight joint between the float and the seat, the inner end of the seat is ground, as at 12, as is also the seat of the valve 13, which engages therewith when the valve is lowered. Float 11 is formed, preferably, of non-corrosive material of a light weight, as I do not depend upon the weight of the float to close the valve, as the suction through the nipple will tend to close and hold the same in a closed position when the oil has reached a point level with the point of the top of the nipple.

In operation the nipple provided with my combined float and cut-off being inserted into the tank and secured on the main line if the tank is full the float will rise, when upon opening the line the float will follow the oil as it lowers until it has reached a point level with the top of the nipple, when the suction will press the valve tightly against the seat, cutting off the egress of oil.

It will be seen that I have provided a valve that is cheap of manufacture and efficient in operation, and one that can be easily applied to any tank now in use.

In Figs. 4 and 5 is illustrated a construction in which the combined float and valve is normally secured to the draw-off pipe and comprises an enveloping-pipe 14, secured to the section 6, said pipe 4 being slightly enlarged at its outer end to admit of a packing 15, interposed between the same and the draw-off pipe, the parts being held assembled by means of a split ring 17, having a nut 18 screwed upon the ends thereof, there being a semicircular washer 19 interposed between the nut and enveloping-pipe to insure a circular bearing upon the entire periphery of the pipe. By means of this construction the combined float and valve may be attached to the draw-off pipe from the inside of the tank when it is empty, or even when it is filled, with the aid of the necessary tools to lower and place the same in position and revolve the nut.

What I claim is—

In an automatic cut-off for oil-tanks, the draw-off pipe, a valve-seat section 6 secured thereto, the forward annular edge thereof being ground to form a seat, a groove in the upper side thereof, a float comprising a shell having a cut-off 10 secured in its rear end, a projection extending therefrom and passing in the groove in the section 6 and pivoted therein, whereby the cut-off 10 moves in the arc of a circle to close or open the entrance to the seat-section and draw-off pipe.

In testimony that I claim the foregoing as my own I hereby affix my signature in presence of two witnesses.

GEORGE W. HESS.

Witnesses:
   CHAS. W. COLE,
   DANIEL C. BEMIS.